(12) United States Patent
Alexander

(10) Patent No.: US 6,393,559 B1
(45) Date of Patent: May 21, 2002

(54) METHOD AND COMPUTER FOR SELF-HEALING BIOS INITIALIZATION CODE

(75) Inventor: Marc D. Alexander, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/303,036

(22) Filed: Apr. 30, 1999

(51) Int. Cl.[7] .............................................. G06F 9/445
(52) U.S. Cl. ........................................................ 713/2
(58) Field of Search ........................... 713/1, 2; 714/23

(56) References Cited

U.S. PATENT DOCUMENTS

| | | |
|---|---|---|
| 5,245,615 A | 9/1993 | Treu |
| 5,379,436 A | 1/1995 | Tanaka |
| 5,491,788 A | 2/1996 | Cepulis et al. |
| 5,528,516 A | 6/1996 | Yemini et al. |
| 5,535,330 A | 7/1996 | Bell |
| 5,596,711 A | 1/1997 | Burckhartt et al. |
| 5,646,535 A | 7/1997 | Dornier |
| 5,661,668 A | 8/1997 | Yemini et al. |
| 5,732,268 A | 3/1998 | Bizzarri |
| 5,764,882 A | 6/1998 | Shingo |
| 5,864,698 A | * 1/1999 | Krau et al. |
| 5,974,546 A | * 10/1999 | Anderson |

* cited by examiner

Primary Examiner—Thomas M. Heckler
(74) Attorney, Agent, or Firm—Haynes and Boone, LLP

(57) ABSTRACT

BIOS boot initialization progress is recorded and, when BIOS boot initialization code fails, the failed boot initialization code is corrected by the BIOS. Intelligence is added to the BIOS which allows failed boot initialization code to be corrected by the BIOS transparently to the user. When the BIOS cannot correct the failed boot initialization code, however, other action is taken which allows the BIOS to continue to boot or to successfully reboot.

21 Claims, 2 Drawing Sheets

METHOD AND COMPUTER FOR SELF-HEALING BIOS INITIALIZATION CODE

BACKGROUND

This disclosure relates generally to correcting problems associated with booting a computer and, more particularly, to a method and computer for self-healing basic input output system (BIOS) initialization code.

When a computer or similar component is powered on, or booted, basic input output system (BIOS) initialization code is used by the computer to test its hardware and connectivity and to load all of the necessary operating code that allows the computer to perform needed tasks. The BIOS initialization code, which is stored in non-volatile memory (e.g. random access memory (RAM), read-only memory (ROM), and/or any device that stores digital information), includes a power-on self test (POST) procedure, to ensure that all computer circuitry is functional before running the operating code.

The BIOS initialization code may be accessed by a processor (e.g. central processing unit (CPU), digital signal processor (DSP), microprocessor, microcontroller, microcomputer, and/or any device that manipulates digital information based on programming instructions) when the computer is booted.

The BIOS, in addition to other functions that are loaded (e.g. reading and writing data to various storage systems such as CD-ROM and DVD-ROM drives), allow the computer to perform its vast array of features. The code that gives the computer this ability is called the operating system (OS). The OS is stored in a non-volatile storage module such as a hard disk. When the computer is booted (or reset) the BIOS code is run and, after POST, the BIOS code allows access to the hard disk at an address where code is stored which permits the loading of the OS from the hard disk. After the OS is loaded, a user may begin to access various features found on the OS (e.g. a spreadsheet, etc.) or accessed through the OS (e.g. the world wide web, email, etc.).

When all of the hardware systems and software files are operable, the BIOS and the OS will be running correctly and the user will be able to perform various actions via the computer. If, however, errors occur during the BIOS or OS initialization, the computer may infinitely reboot or hang (lock-up) at the offending code. For example, a user may continuously place and remove add-in cards and/or peripherals (or other components) into and out of the computer. In this situation, the BIOS may get confused and assign resources (e.g. input output (I/O) or DMA (memory) addresses) for an add-in card that the BIOS believes is still in the computer but has actually been removed from the computer. Thus, the computer will allocate new resources for an add-in card that is later placed in the computer. If this situation is repeated enough times, the BIOS will eventually run out of resources and may infinitely reboot or lock-up. Additionally, hardware and software errors may occur during the loading of the OS. For example, mechanical devices (such as a hard disk drive, CD-ROM, DVD-ROM, etc.) may become inoperable because of the problems associated with the structure and operation of mechanical devices. Software may also become corrupt and, for example, may not allow the BIOS code to access the hard disk thereby not allowing the OS to be loaded.

These types of problems are expensive to solve and typically require a field service representative to visit the site where the error occurred and attempt to fix the problem or have a technical support representative attempt to fix the problem over the phone. For example, the technical support representative may remotely attempt to solve the problem by offering common fixes to the problem (i.e. direct the user to remove an add-in card, to disable or remove peripherals, etc.). If the problem cannot be fixed through the guidance of a technical support representative, a field service representative may visit the site and bring diagnostic tools (hardware and software) which display more detailed information to determine what the BIOS was doing at the moment of failure. These solutions are costly, time consuming, and degrade the user's experience.

SUMMARY

The present disclosure, therefore, provides a method and computer for self-healing BIOS initialization code. To this end, the boot initialization progress of the BIOS is recorded and, if the boot initialization code fails, the failed boot initialization code is corrected by the BIOS. The boot initialization progress provides an indication of the location in the BIOS initialization code of where the boot initialization failed.

A major advantage is achieved with the method and computer of the present disclosure since intelligence is added to the BIOS which allows failed boot initialization code to be corrected by the BIOS transparently to the user. When the BIOS cannot correct the failed boot initialization code, however, other action is taken which allows the BIOS to continue to boot or to successfully reboot.

As such, the problems discussed above are minimized allowing for a more efficient solution that increases the user's experience.

DETAILED DESCRIPTION

Figure 1:
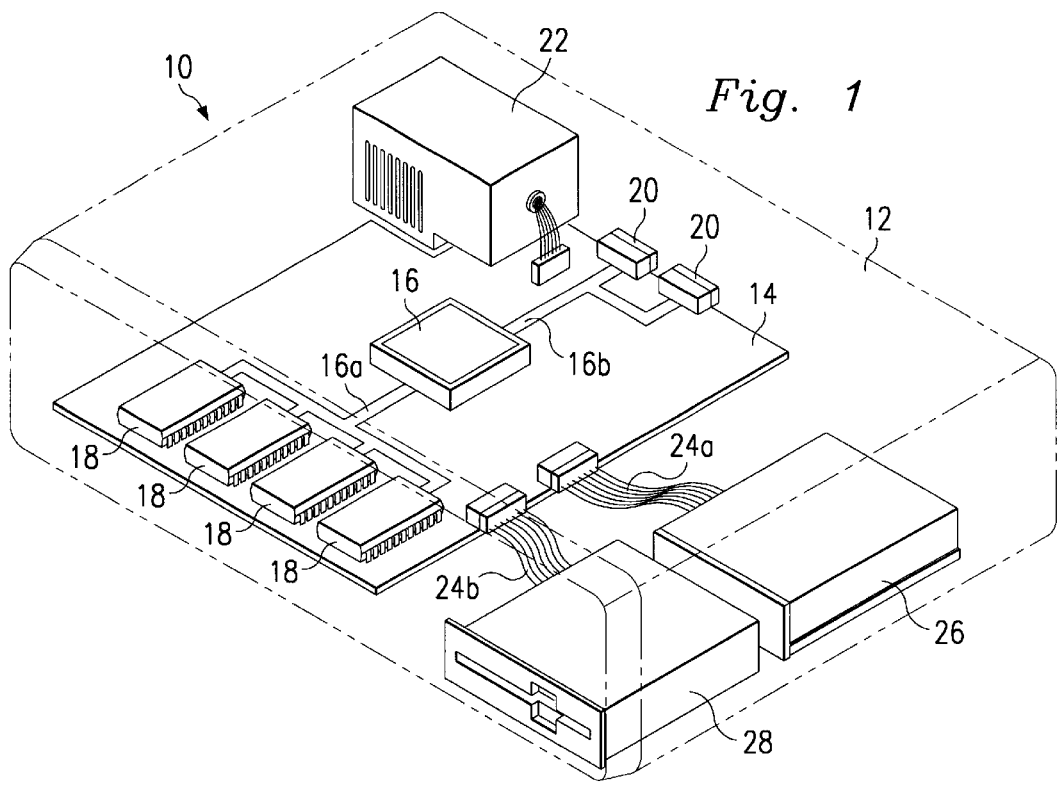
FIG. 1 is a diagrammatic view depicting some of the basic components of the computer of the present disclosure.

FIG. 1 depicts a personal computer, shown in general by the reference numeral 10, which can be in the form of a desktop computer, a laptop computer or a tower computer. The computer 10 includes a chassis 12 in which a motherboard 14 is mounted. A processor 16, a plurality of memory modules 18, and two I/O devices 20 are mounted on the motherboard 14. Two buses 16a and 16b are also provided on the motherboard 14 and connect the processor 16 to the memory modules 18 and to the input/output devices 20, respectively. A power supply 22 is connected to the motherboard 14, and a pair of cable assemblies 24a and 24b connect the power supply to a hard drive unit 26 and a disk drive unit 28, respectively. It is understood that other components, electrical traces, electrical circuits and related devices (not shown) are provided in the chassis 12. Since these are all conventional, they will not be described in any further detail.

Figure 2:
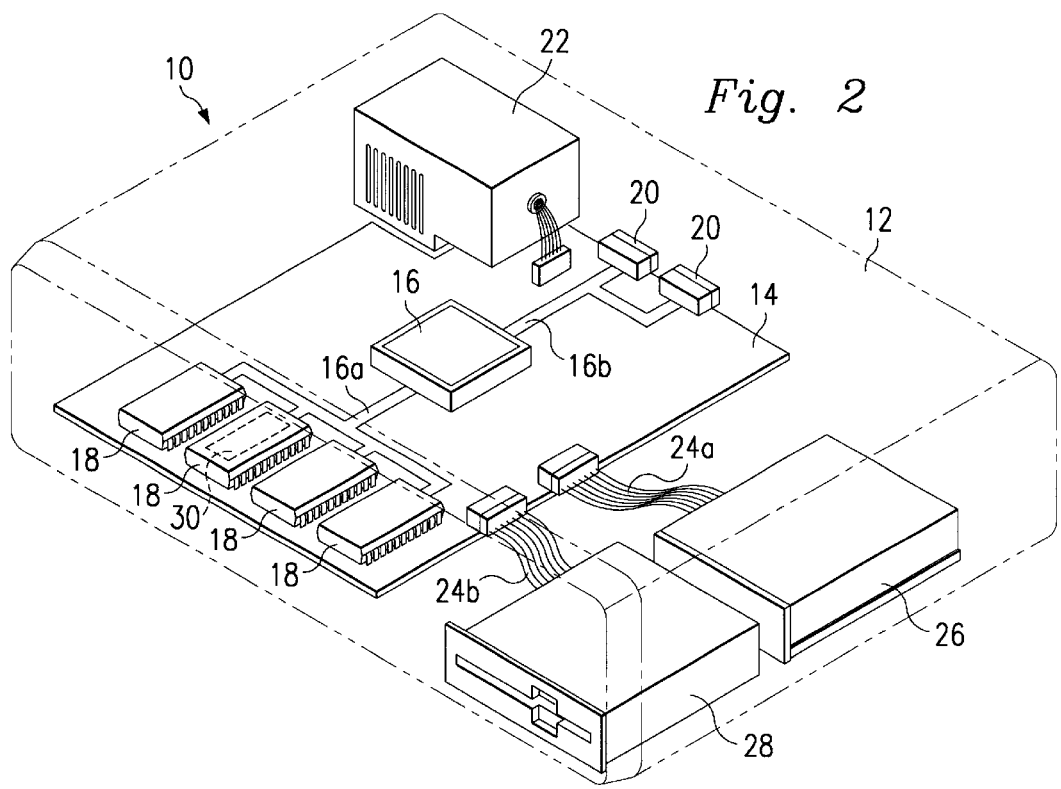
FIG. 2 is a diagrammatic view of the memory and the BIOS of the computer of the present disclosure.

FIG. 2 depicts the motherboard 14 of the computer 10 that includes the memory modules 18 and the processor 16. The memory modules 18 include a self-healing BIOS 30 that records and stores the BIOS boot initialization code and, when the boot initialization code fails, corrects the failed boot initialization code. The self-healing BIOS 30 can be placed in part and/or in whole in one or more of the memory modules 18. The memory module 18 that stores the self-healing BIOS 30 is preferably a flash storage module but may be any device that stores digital information. The self-healing BIOS 30 includes intelligence that is built into the BIOS booting process to record the steps involved in the booting process. The intelligence also comprises a host of possible failures and the possible fixes for them. If a failure occurred during the boot process, the step or steps involved with the failure are analyzed and, based on the type of failure, are corrected by the BIOS intelligence. Thus, a failure may occur that ordinarily would have caused the computer to hang or infinitely reboot but that can now be fixed transparently to the user. For example, when booting from a "suspend-to-ram" state, the self healing BIOS looks at key memory locations to verify that the system RAM has been preserved across the suspend transition. If the memory looks corrupted, the self healing BIOS code clears the "resume from suspend" indicator and treats the boot normally.

In certain situations, however, the computer 10 will have to be rebooted to ensure a correction (e.g. a software or hardware fix) is initialized. For example, if the computer 10 failed to boot because of the insertion of a new add-in card, the Extended System Configuration Data (ESCD), which stores resource information in a flash chip, can be cleared. The computer 10 can then be rebooted by the self-healing BIOS 30 to enact the clearing of the ESCD and allow the computer to boot (i.e. reboot) successfully.

In most of the possible cases (the computer booted successfully with no failures, booted successfully with a failure that did not require a reboot, or booted successfully with a failure that did require a reboot), the steps that initialized properly as well as the step or steps involved in the failure will be displayed. The steps can be displayed on an output device which includes: a computer screen (monitor), any other screen (e.g. phone screen, etc.), and/or paper. The step or steps are displayed by the BIOS 30 and provide information regarding the failure such as a description of where the boot initialization code failed. This description comprises at least one of: an identification number, a written label, an icon, a sound, and any combination of the identification number, the written label, the icon, and the sound.

If the boot initialization code failed after video was initialized, the BIOS would provide the identification number and/or the written label of where the boot initialization code failed. For example, if the failure occurred in the initialization of the math coprocessor, the screen may display all or some of the following information as shown in Table 1:

TABLE 1

| 2 | MCPU | Math CPU locked | 11/16/98 9:31:28 |

The first field is the identification number (arbitrarily chosen as 2) which is an internal checkpoint number. If the identification number was a 0, that would indicate that no failures were detected during the initialization of the math coprocessor. The next three fields comprise the written label and include the name of the initialization code that failed (i.e. MCPU), a brief description of the reason for failure, and the date and time of the failure. The written label can be expanded to include the computer or component on which the initialization code failed and if the code failed before or after video was initialized.

If, however, the boot initialization code fails before video was initialized, the BIOS would provide beep codes to indicate where the boot initialization code failed. Beep codes, which are sounds emanated by the computer 10, are provided when not enough of the hardware is initialized to provide an identification number or a written label of the failure. For example, to describe the fact that the serial port test failed, a user may hear 1 beep, followed by 2 beeps, followed by 3 beeps to indicate this fact. Additionally, (when the computer has video and input devices functioning) a serial port test icon may flash and/or change shades or colors on the computer screen to indicate this fact. The icon can then be accessed (e.g. "clicked-on" by the mouse) to get information regarding the failure.

There may be instances when the BIOS cannot correct the failed boot initialization code. In such instances, at least one of the following may be performed: skipping the failed boot initialization code by the BIOS, prompting the user to skip the failed boot initialization code, correcting the failed boot initialization code by an operator (i.e. technical support representative), correcting the failed boot initialization code by the user, and attempting to reboot.

Typically, when a computer locks-up, a user will power the computer off and attempt to reboot. The computer will hopefully reboot correctly, thus overcoming the failure associated with the computer being locked-up. The user may then continue to perform the various actions he/she was involved with. If, however, the computer still cannot boot correctly because of the same failure associated with the computer being locked-up, the user will be unable to perform the various actions he/she was involved with and may have to call a technical support representative and/or a field service representative. As explained earlier, there are considerable disadvantages associated with this solution. Utilizing the diagnostics mode of the self-healing BIOS 30, however, a preferable solution may be reached. For example, the self-healing BIOS 30 can identify the initialization code that caused the computer to lock-up and, before that code is initialized again (which would cause the same failure), the self-healing BIOS may skip the failed boot initialization code. A message may appear on the screen informing the user of this action or may prompt the user to skip the failed boot initialization code. For example, if no Interrupt Request (IRQ) resource is available for a recently added card (because, for example, they have been used for previously added cards), the BIOS can query the user to either remove all previous IRQ assumptions and re-assign the IRQs or to simply ignore the new card. As such, the self-healing BIOS 30 can make intelligent decisions on overcoming various failures.

There may be instances in which the user may have to call a technical support representative to correct certain problems. In this scenario, the user will be able to provide beep codes and/or identification numbers to the technical support representative to indicate the location of the failure. Thus, the technical support representative will know exactly which procedure in the BIOS failed to boot (especially if the failure occurred before or after video was initialized). As opposed to relying on a list of possible solutions to the failure as is typically done, the technical support representative can now pin-point the problem and provide a quicker solution to the user. As such, the user and the technical support representative can now become more efficient because each will have more time to perform other actions.

Additionally, the self-healing BIOS 30 may direct the user to, or may itself, download potential fixes from a database to correct the failed boot initialization code. For example, the self-healing BIOS 30 may not contain all of the possible solutions to all of the possible failures that can be encountered during booting (because of space constraints and/or because the failures may not have occurred yet and/or the solutions may not have been found yet). In such a scenario, a portion of the solutions (e.g. the top 100 solutions to the most common problems) can be placed in the self-healing BIOS. The remaining solutions can be placed in, for example, a database that can be accessed via the world wide web by the self-healing BIOS or the user based on the failure.

For example, the self-healing BIOS 30 may note a particular failure and, upon realizing it does not have the possible solution, may access the solution from the database. Additionally, the self-healing BIOS 30 may send a message to the user and prompt the user to download the particular solution to the problem. The user could access the database and, based on the description of the problem (i.e. the identification number, written label, icon, and/or sound), could download a potential solution. For example, the user may receive a message from the self-healing BIOS 30 that states a failure occurred with an identification number of 2. The user could then be directed to a particular web site (that can be password protected), find the possible solution(s) that correspond to the identification number (e.g. 2) and download the solution(s) in any known manner to the computers' memory. The user may then reboot his/her computer and have the new solution (code) run to correct the problem.

Figure 3:
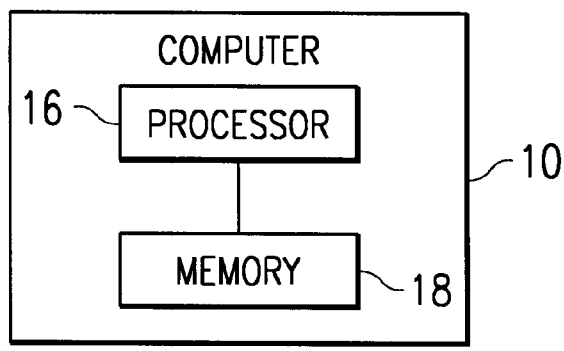
FIG. 3 is a diagrammatic view of the memory and the processor of the computer of the present disclosure.

FIG. 3 depicts the computer 10 that comprises the processor 16 and memory 18. The memory 18 is operably coupled to the processor 16 and stores programming instructions that, when read by the processor, cause the processor to record BIOS boot initialization code and, when the boot initialization code fails, correct the failed boot initialization code. The processor 16 and the memory 18 perform similar functions to those described in FIG. 2 and thus will not be discussed further.

Figure 4:
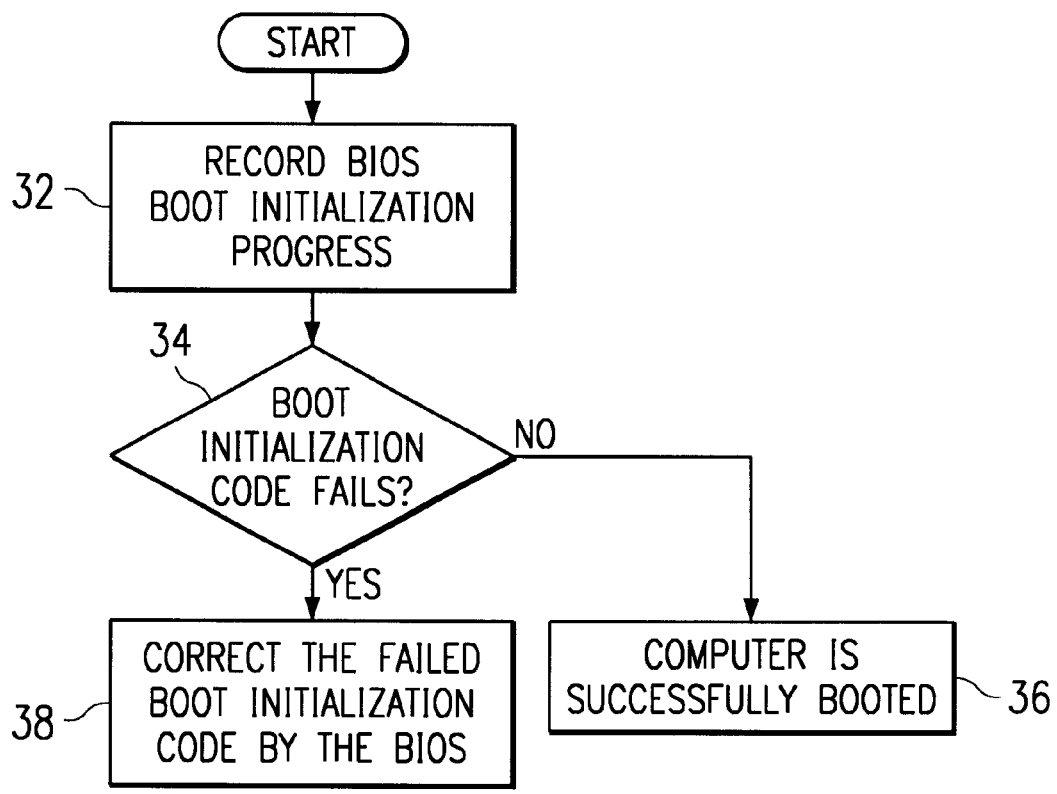
FIG. 4 is a flow chart depicting a method for a self-healing BIOS in accordance with the present invention.

Referring to FIG. 4, a method for a self-healing BIOS begins at step 32 where the BIOS boot initialization code is recorded by the self-healing BIOS as the computer is booted. At step 34, the boot initialization code is monitored for any failures. If the boot initialization code does not fail, the method proceeds to step 36 where the computer is successfully booted and the user can perform various tasks on the computer. If, however, the boot initialization code fails, the method proceeds to step 38 where the failed boot initialization code is corrected by the BIOS.

The present disclosure thus enjoys several advantages. For example, intelligence is added to the BIOS which allows failed boot initialization code to be corrected by the BIOS. These corrections can be made transparently to the user. When the BIOS cannot correct the failed boot initialization code, however, other action is taken by the BIOS, the user, and/or the technical support representative which allows the BIOS to continue to boot or to successfully reboot.

It is understood that variations may be made in the foregoing without departing from the scope of the present invention. For example, other information, such as the company that made the product or the software that is failing, statistics on the total number of failures or number of specific failures, can be displayed on the screen regarding the failure. Further, the description for the reason for failure can be expanded to include more detailed information. This, and other information, can be used by the technical support representative to further understand the cause of the failure and provide an expedited solution. Additionally, when a failure occurs that cannot be corrected by the BIOS, that failure (and any related messages) may be simultaneously displayed on a network administrator's screen as well as the users screen allowing the network administrator to track and assess the quality of the network.

It is understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

What is claimed is:

1. A method performed by a computer system that includes a basic input output system (BIOS) including BIOS boot initialization code comprising:

initiating the BIOS boot initialization code;

recording information associated with the BIOS boot initialization code;

if the BIOS boot initialization code fails, accessing solution code associated with the information from a database located externally from the computer system; and causing the solution code to be executed.

2. The method of claim 1 wherein the recording the information associated with the BIOS boot initialization code further comprises storing the information in a memory.

3. The method of claim 1 wherein the recording the information associated with the BIOS boot initialization code further comprises displaying the information on an output device.

4. The method of claim 1 wherein the recording the information associated with the BIOS boot initialization code further comprises, if the BIOS boot initialization code fails after video was initialized, providing a description of where the BIOS boot initialization code failed to an output device.

5. The method of claim 1 wherein the recording the information associated with the BIOS boot initialization code further comprises, if the BIOS boot initialization code fails before video was initialized, providing beep codes to an output device to indicate where the BIOS boot initialization code failed.

6. The method of claim 1 further comprising:

causing the computer system to be rebooted prior to the solution code being executed.

7. The method of claim 4 wherein the description comprises an identification number.

8. A memory associated with a computer system comprising:

a basic input output system (BIOS) that includes BIOS boot initialization code that:

initiates the BIOS boot initialization code;

records information associated with the BIOS boot initialization code;

if the BIOS boot initialization code fails, accesses solution code associated with the information from a database located externally from the computer system; and causes the solution code to be executed.

9. The memory of claim 8 wherein the BIOS stores the information in a memory.

10. The memory of claim 8 wherein the BIOS further displays the information on an output device.

11. The memory of claim 8 wherein the BIOS further provides a description of where the BIOS boot initialization code failed if the BIOS boot initialization code fails after video was initialized.

12. The memory of claim 8 wherein the BIOS further provides beep codes to an output device to indicate where the BIOS boot initialization code failed if the BIOS boot initialization code fails before video was initialized.

13. The memory of claim 8 wherein the BIOS causes the computer system to be rebooted prior to the solution code being executed.

14. The memory of claim 11 wherein the description comprises an identification number.

15. A computer system comprising:

a processor; and a memory operably coupled to the processor, wherein the memory stores instructions that, when executed by the processor, cause the processor to:

initiate a boot initialization code;

record information associated with the boot initialization code;

if the boot initialization code fails, access solution code associated with the information from a database located externally from the computer system; and cause the solution code to be executed.

16. The computer system of claim 15 wherein the memory further comprises instructions that cause the processor to store the information in the memory.

17. The computer system of claim 15 wherein the memory further comprises instructions that cause the processor to display the information an output device.

18. The computer system of claim 15 wherein the memory further comprises instructions that cause the processor to provide a description of where the boot initialization code failed if the boot initialization code fails after video was initialized.

19. The computer system of claim 15 wherein the memory further comprises instructions that cause the processor to provide beep codes to an output device to indicate where the boot initialization code failed if the boot initialization code fails before video was initialized.

20. The computer system of claim 15 wherein the memory further comprises instructions that cause the processor to reboot the computer system prior to the solution code being executed.

21. The computer system of claim 18 wherein the description comprises an identification number.

* * * * *